(12) United States Patent
Hariyama et al.

(10) Patent No.: US 11,635,295 B2
(45) Date of Patent: Apr. 25, 2023

(54) SHAPE MEASURING SYSTEM AND SHAPE MEASURING METHOD

(71) Applicant: Hitachi, Ltd., Tokyo (JP)

(72) Inventors: Tatsuo Hariyama, Tokyo (JP); Masahiro Watanabe, Tokyo (JP); Atsushi Taniguchi, Tokyo (JP); Kenji Maruno, Tokyo (JP); Akio Yazaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 48 days.

(21) Appl. No.: 17/426,203

(22) PCT Filed: Feb. 13, 2020

(86) PCT No.: PCT/JP2020/005548
§ 371 (c)(1),
(2) Date: Jul. 28, 2021

(87) PCT Pub. No.: WO2020/170932
PCT Pub. Date: Aug. 27, 2020

(65) Prior Publication Data
US 2022/0178680 A1    Jun. 9, 2022

(30) Foreign Application Priority Data

Feb. 18, 2019   (JP) .............................. JP2019-026172

(51) Int. Cl.
*G01B 11/24* (2006.01)
*G01B 11/14* (2006.01)
*G01B 9/02091* (2022.01)

(52) U.S. Cl.
CPC .......... *G01B 11/2441* (2013.01); *G01B 11/14* (2013.01); *G01B 9/02091* (2013.01)

(58) Field of Classification Search
CPC ....... G01B 11/14; G01B 11/24; G01B 11/026; G01B 11/2441; G01B 9/02091
See application file for complete search history.

(56) References Cited

U.S. PATENT DOCUMENTS 6,587,185 B1   7/2003   Ide et al.
2013/0222815 A1*   8/2013   Patzwald ............. G01B 11/026
356/612

(Continued)

FOREIGN PATENT DOCUMENTS

| JP | 2001-13244 A | 1/2001 |
| JP | 2009-198460 A | 9/2009 |
| JP | 2018-31604 A | 3/2018 |

OTHER PUBLICATIONS

Google translation of patent document JP 2001013244A (Hidekazu Ide) (Year: 1999).*

(Continued)

*Primary Examiner* — Tarifur R Chowdhury
*Assistant Examiner* — Carlos Perez-Guzman
(74) *Attorney, Agent, or Firm* — Crowell & Moring LLP

(57) ABSTRACT

A shape of an object is measured with a high degree of accuracy. A shape measurement system comprises: a distance measuring head for irradiating an object with light and receiving light reflected from the object; a distance measuring device for generating a distance detection waveform on the basis of the reflected light; and a control device for analyzing the distance detection waveform and calculating a measured distance value to the object. The shape measurement system is characterized in that the control device calculates a feature amount of the distance detection waveform and performs at least one of a process of correcting an error in the measured distance value by substituting the feature amount into a correction formula and a process of performing a confidence weighting of an error in the mea- (Continued)

sured distance value by substituting the feature amount into a confidence weighting formula.

10 Claims, 15 Drawing Sheets

(56) References Cited

U.S. PATENT DOCUMENTS

| | | | |
|---|---|---|---|
| 2015/0022658 A1 | 1/2015 | Farahi et al. | |
| 2016/0047905 A1* | 2/2016 | Shiraki | G01S 17/10 356/5.03 |
| 2020/0191562 A1* | 6/2020 | Yamaguchi | G01B 11/24 |

OTHER PUBLICATIONS

International Search Report (PCT/ISA/210) issued in PCT Application No. PCT/JP2020/005548 dated Mar. 24, 2020 with English translation (five (5) pages).

Japanese-language Written Opinion (PCT/ISA/237) issued in PCT Application No. PCT/JP2020/005548 dated Mar. 24, 2020 (four (4) pages).

\* cited by examiner

[FIG. 1]
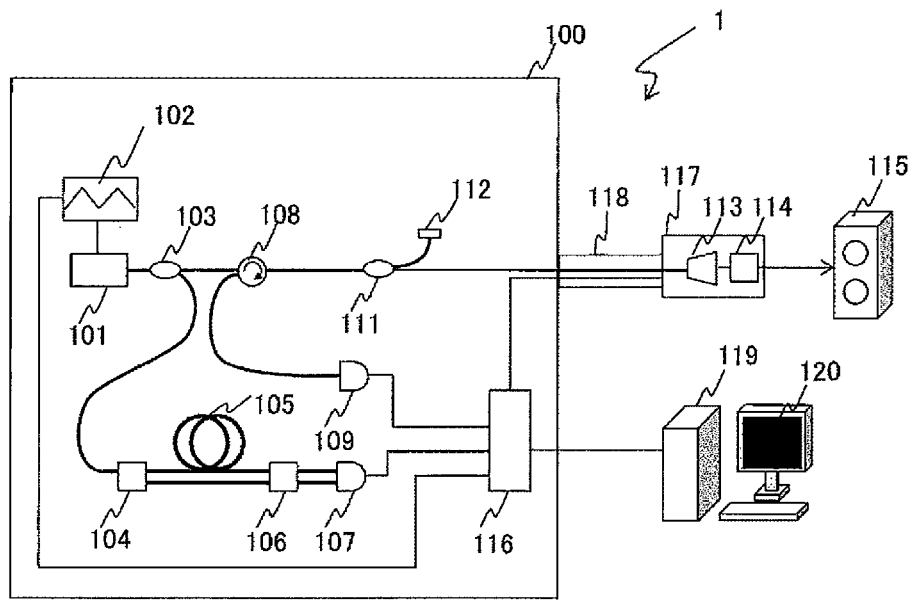
[FIG. 2]
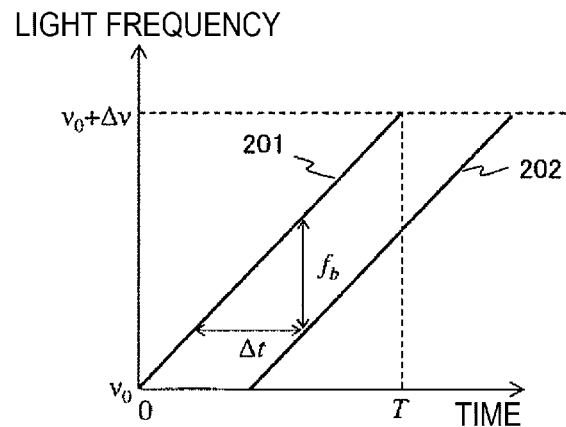
[FIG. 3]
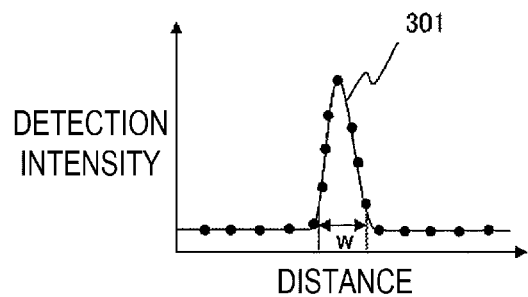

[FIG. 4]
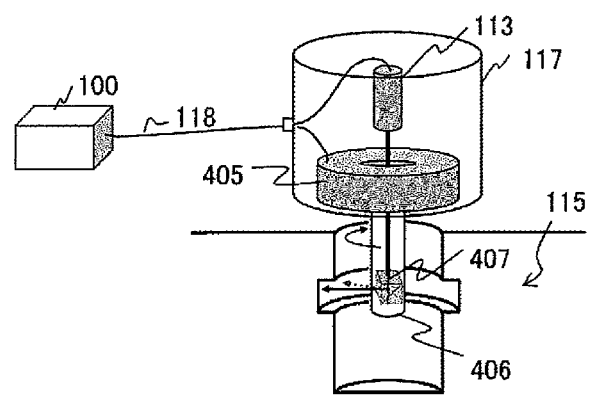

[FIG. 5]
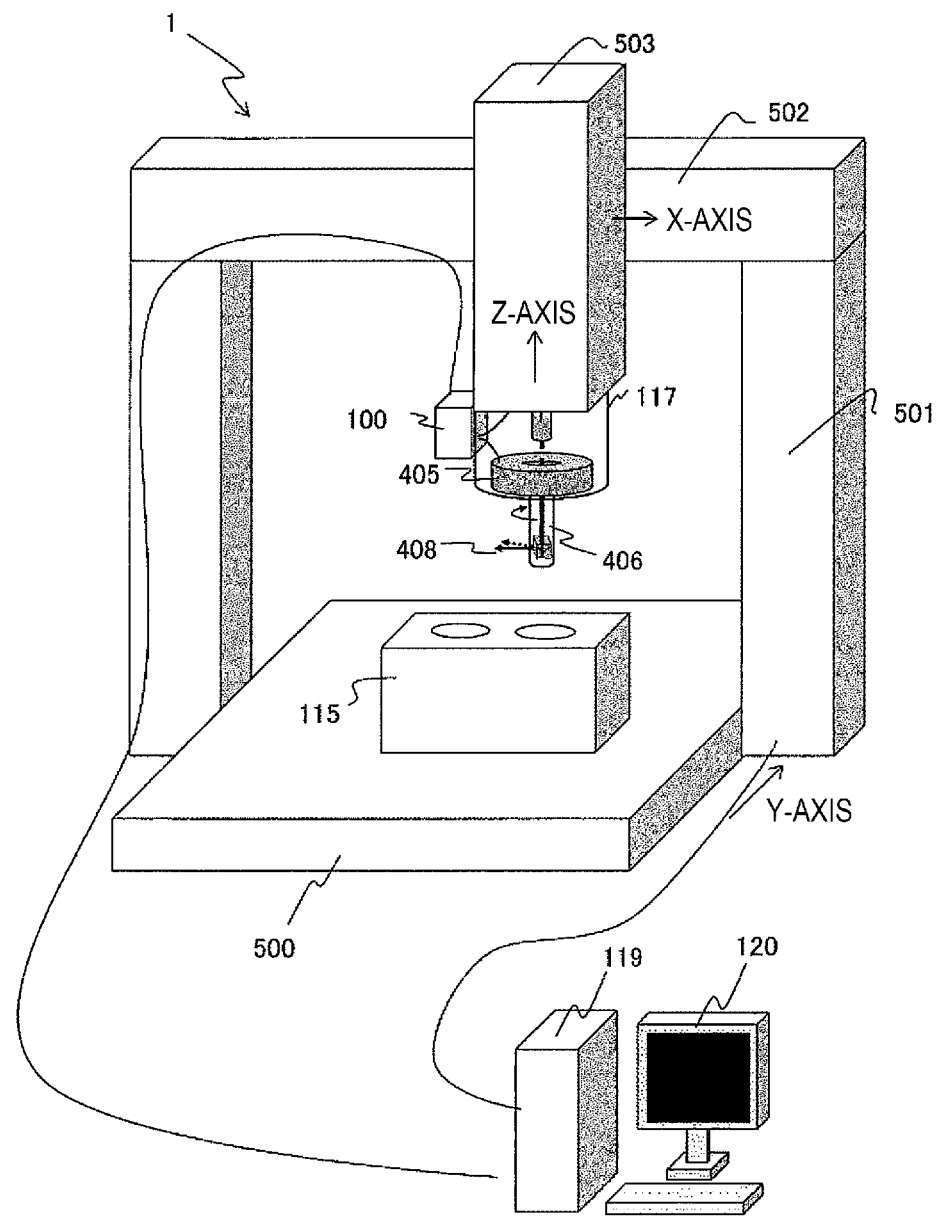

[FIG. 6]
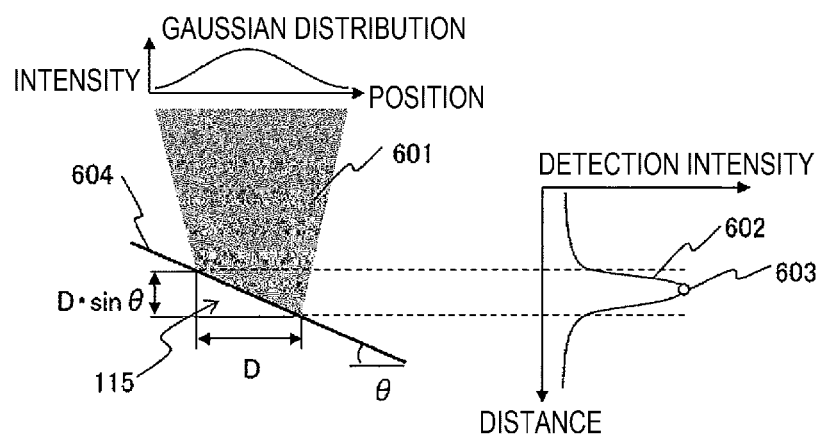
[FIG. 7]
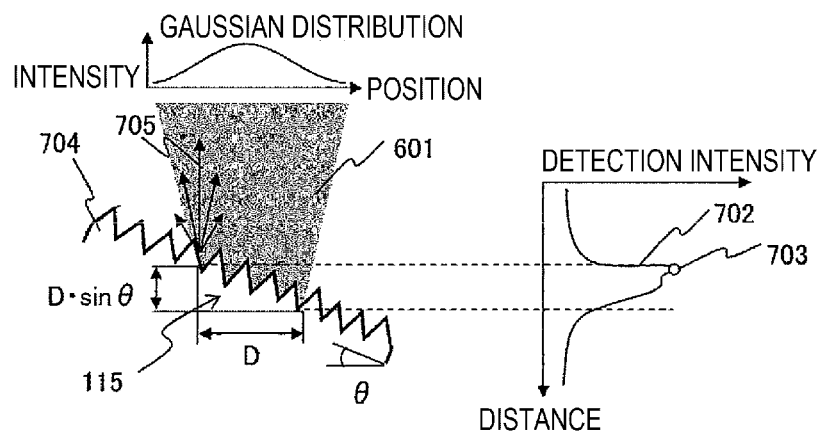

[FIG. 8]
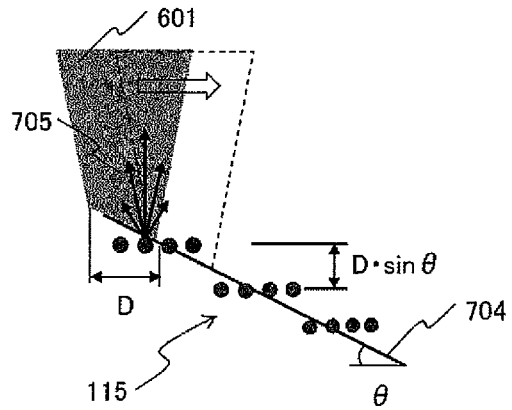
[FIG. 9]
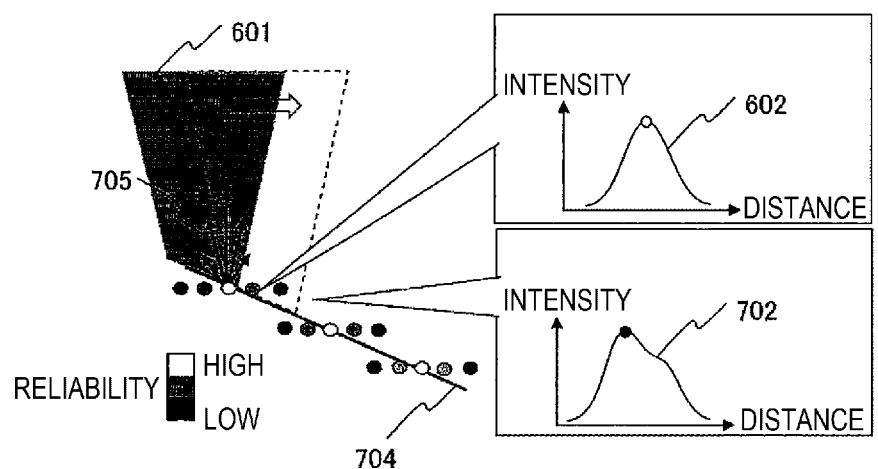
[FIG. 10]
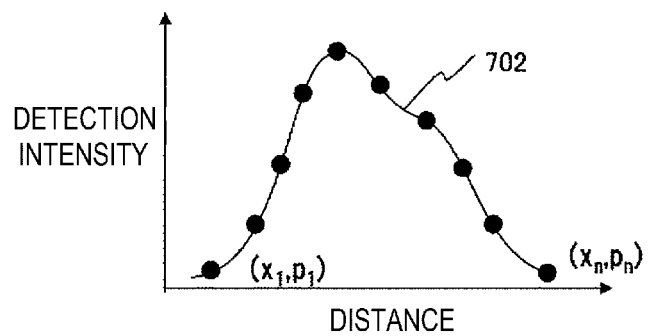

[FIG. 11]
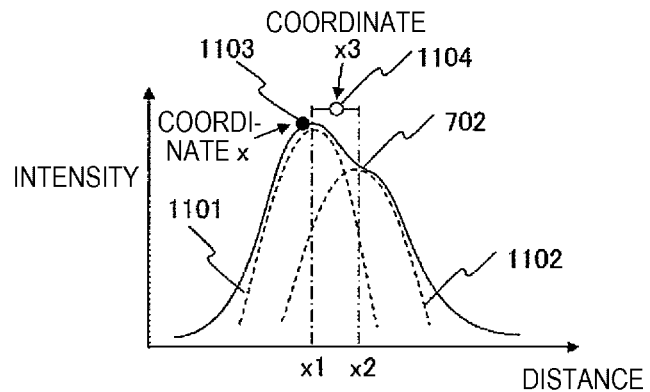
[FIG. 12]
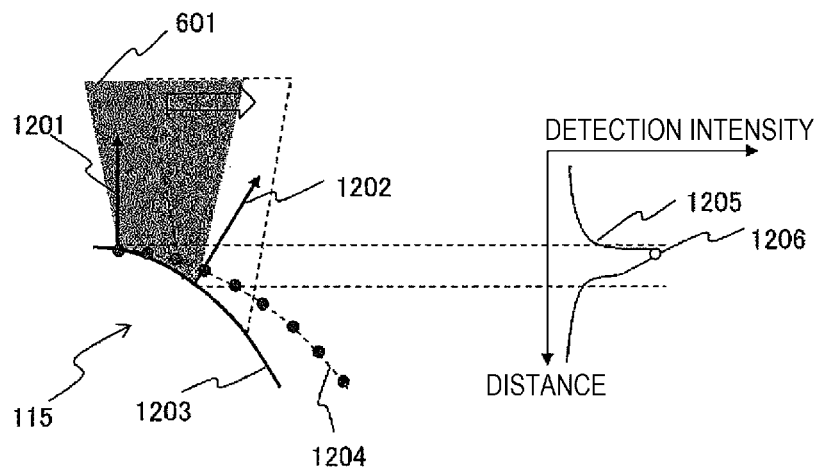
[FIG. 13]
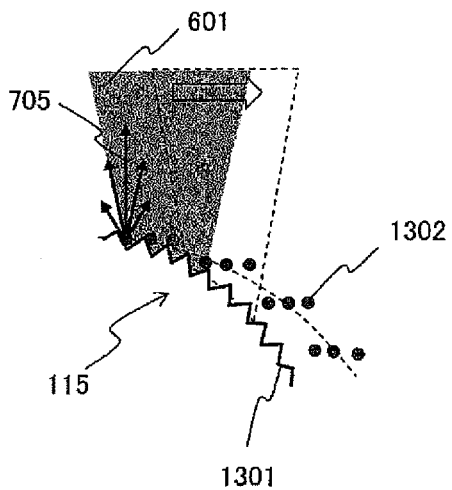

[FIG. 14]
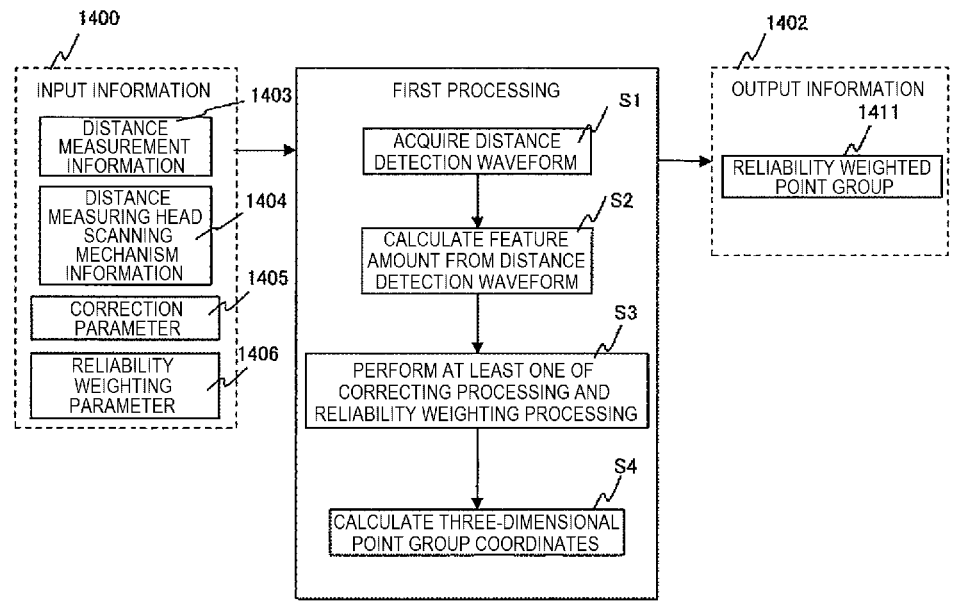
[FIG. 15]
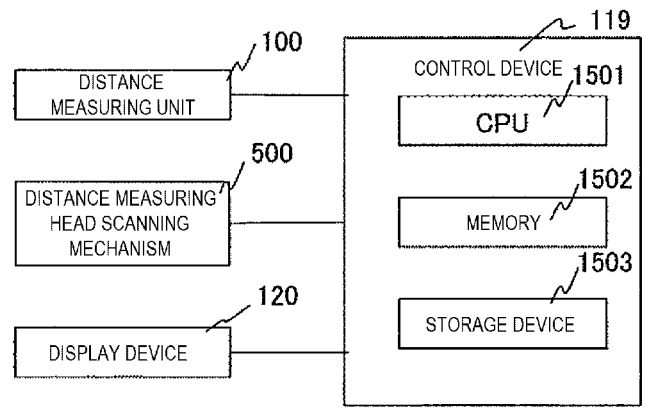

[FIG. 16]
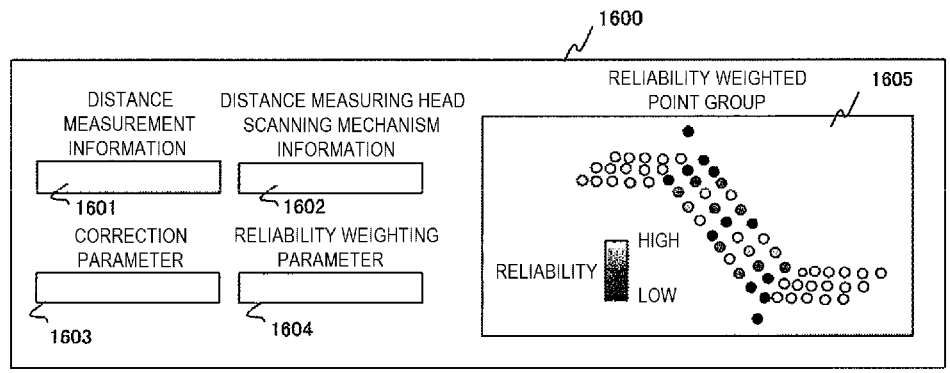
[FIG. 17]
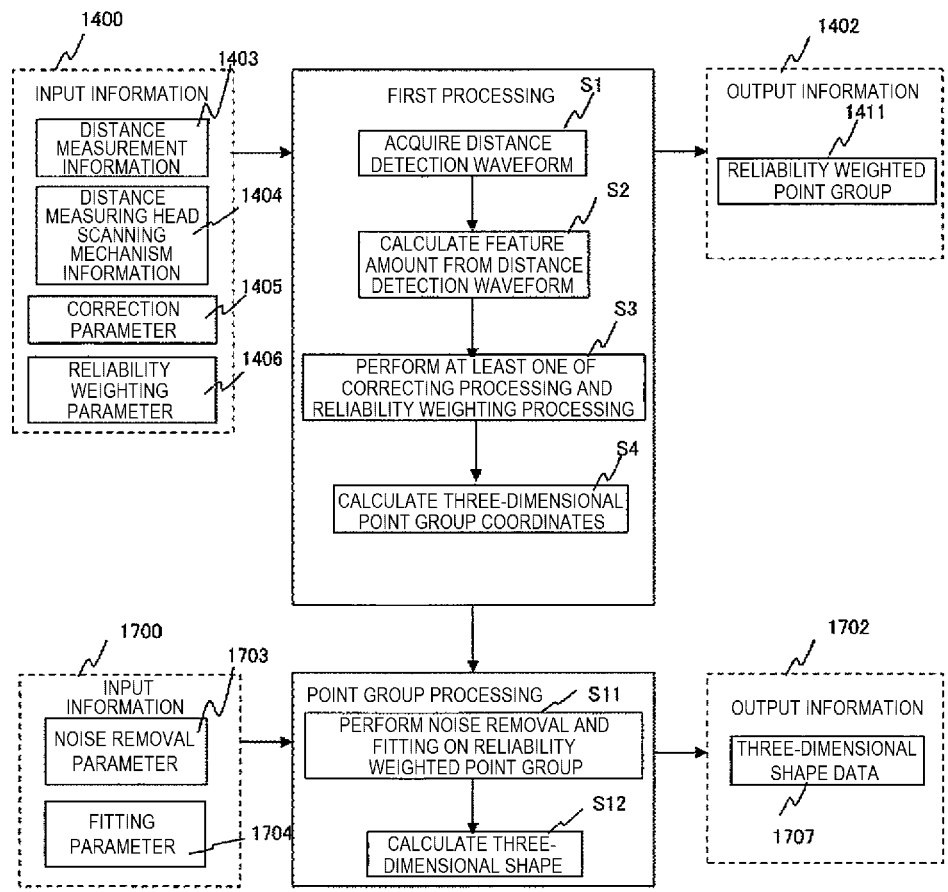

[FIG. 18]
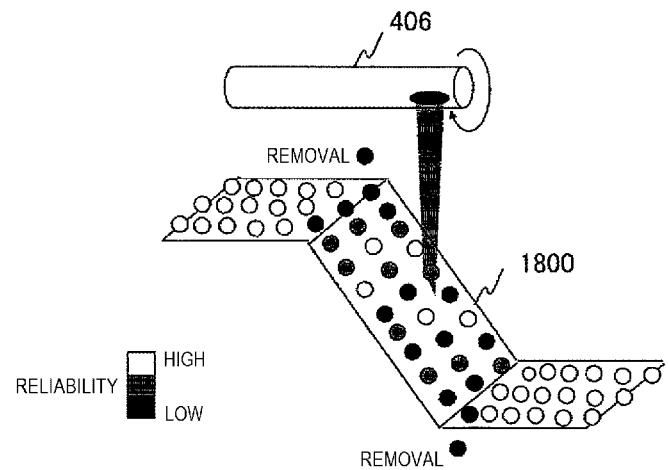
[FIG. 19]
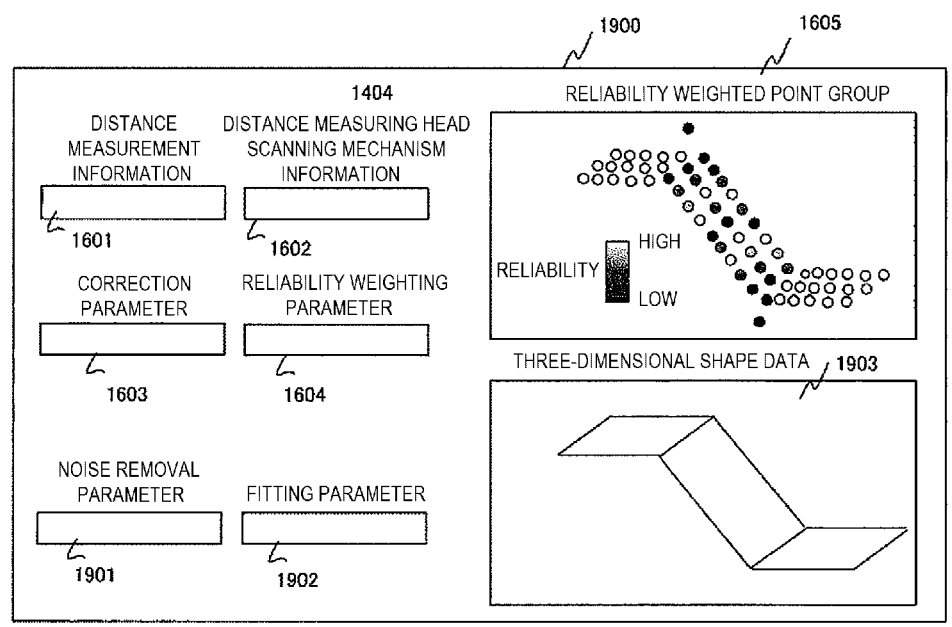

[FIG. 20]
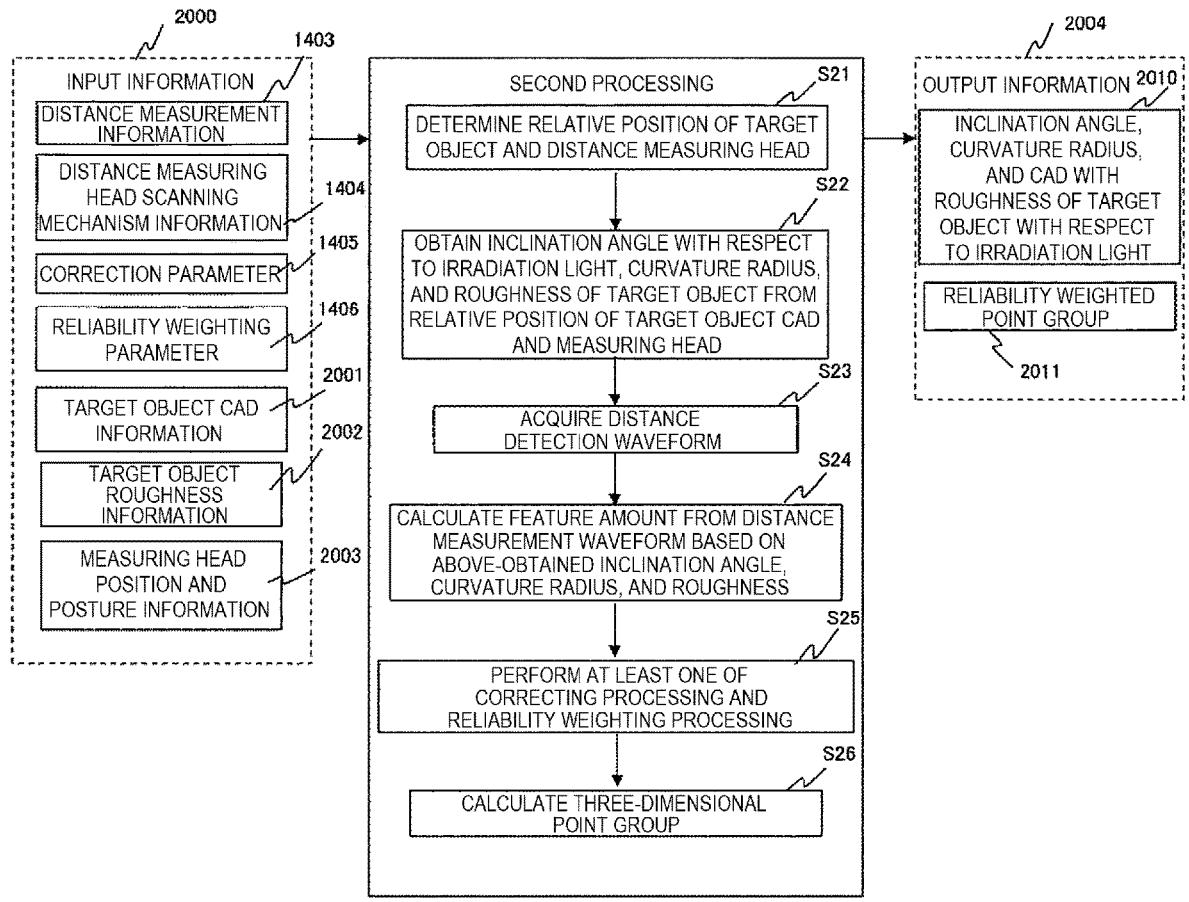
[FIG. 21]
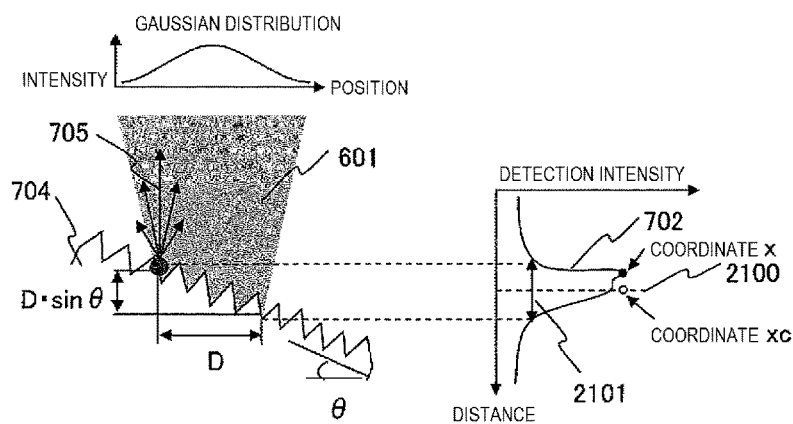

[FIG. 22]
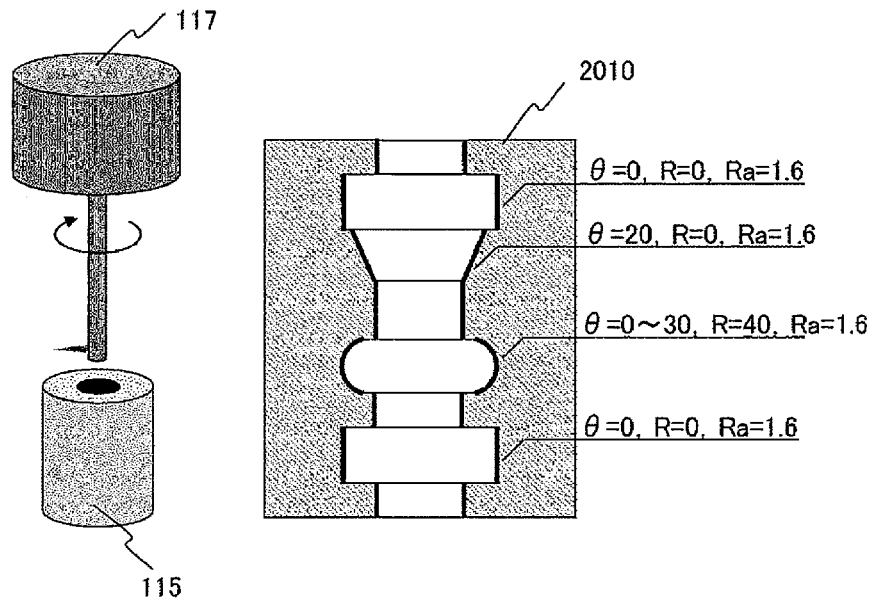
[FIG. 23]
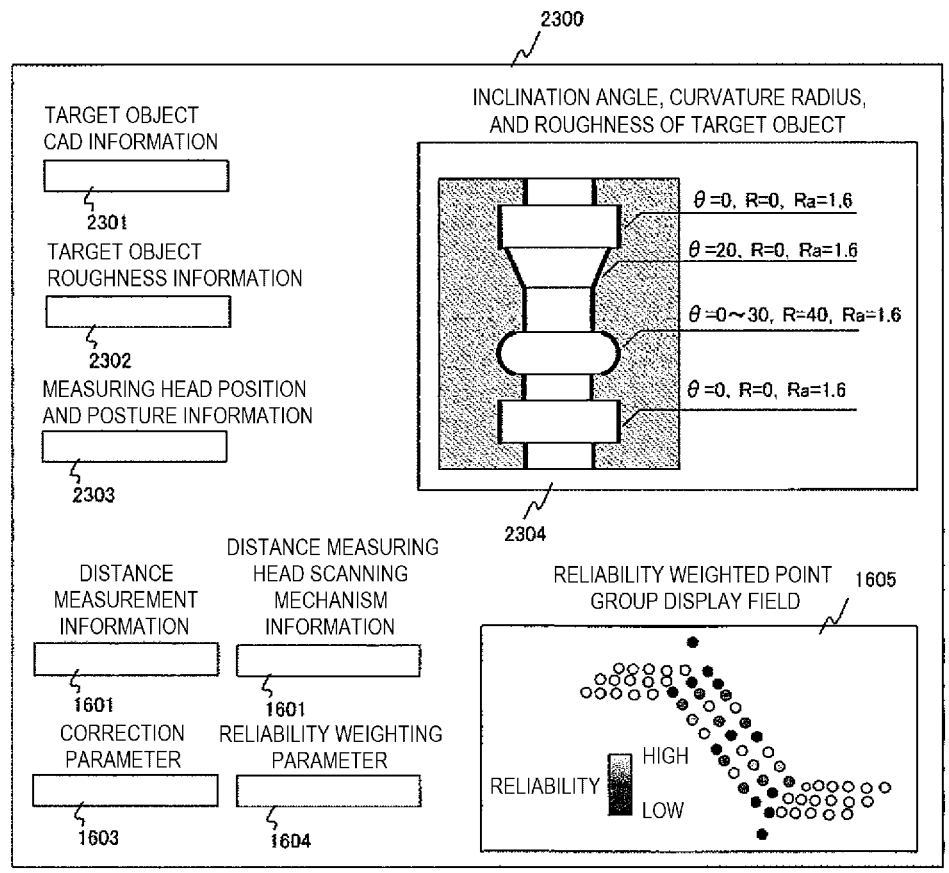

[FIG. 24]
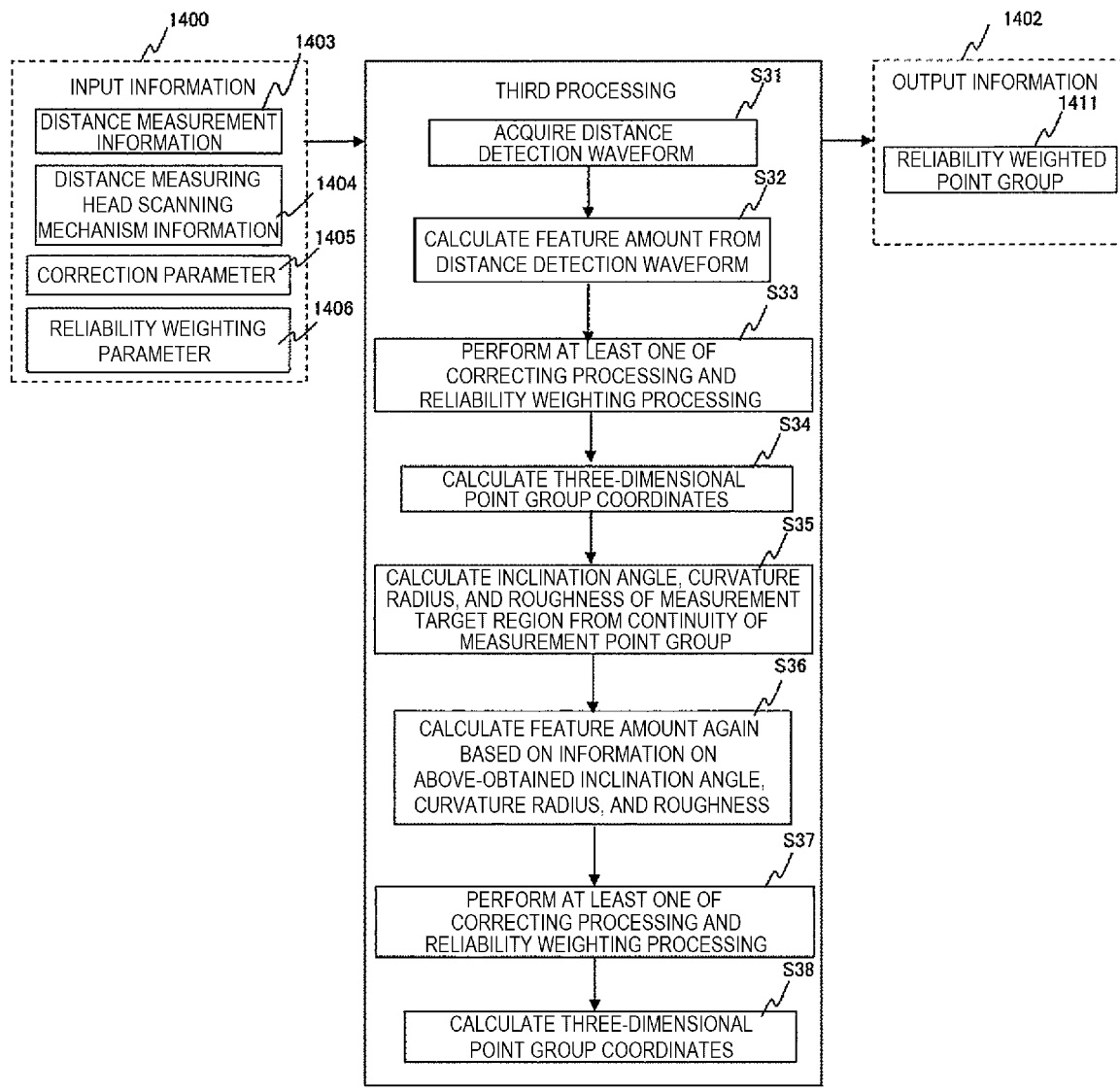

[FIG. 25]
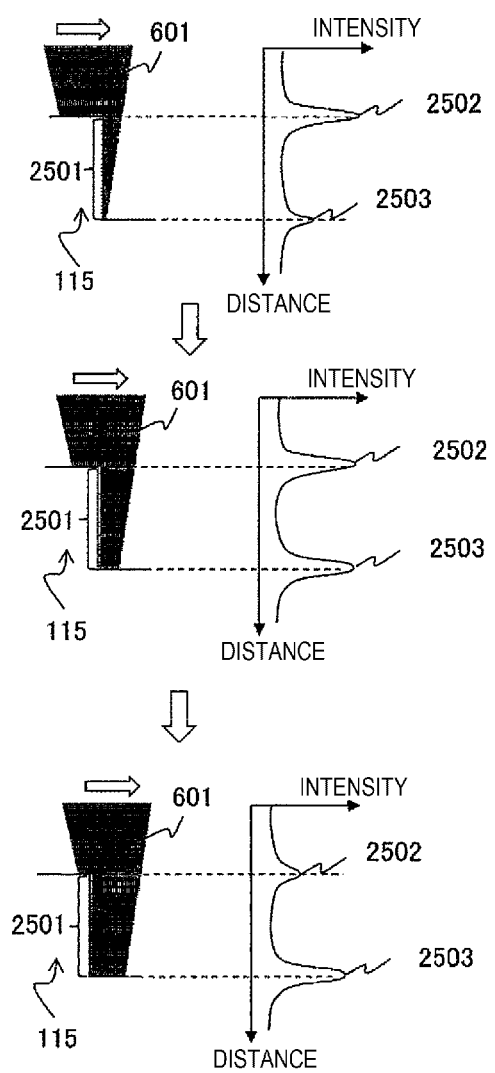

[FIG. 26]
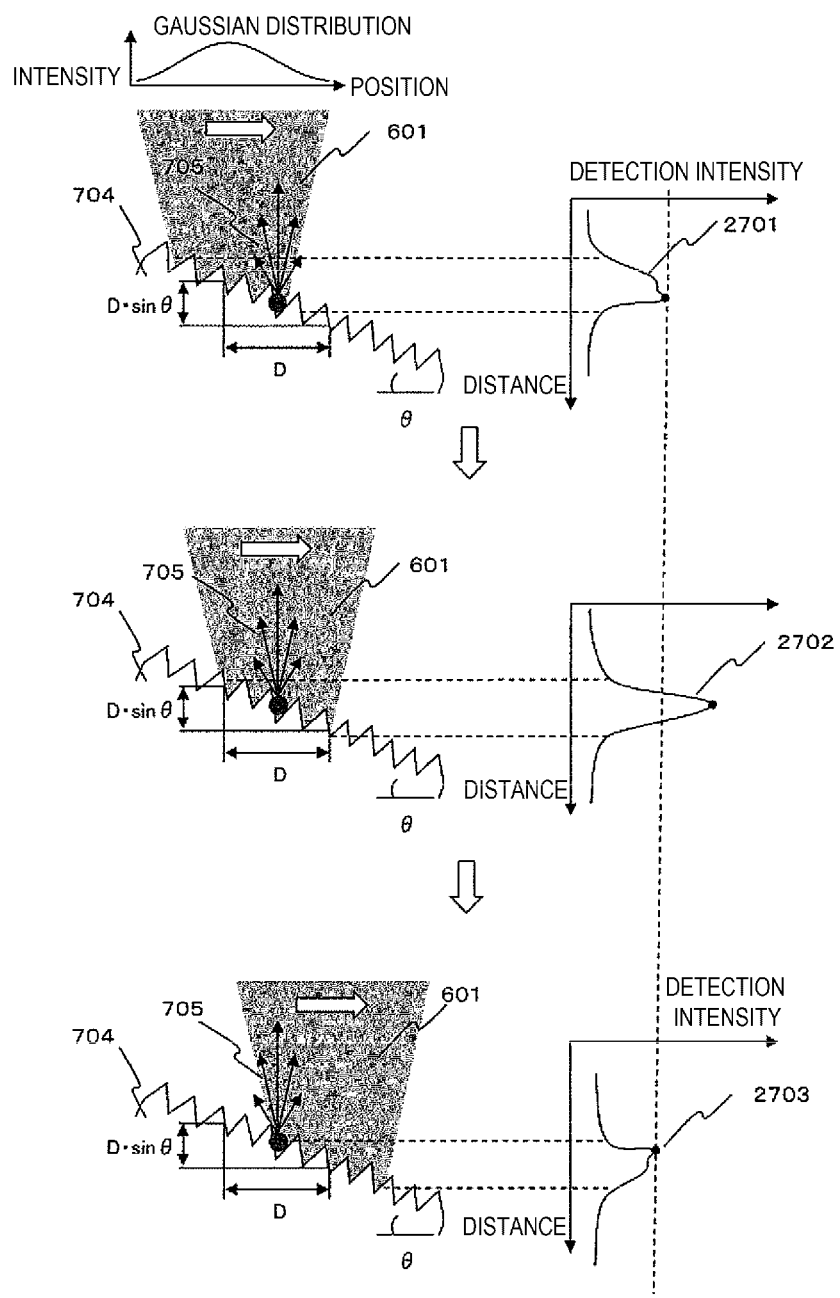

[FIG. 27]
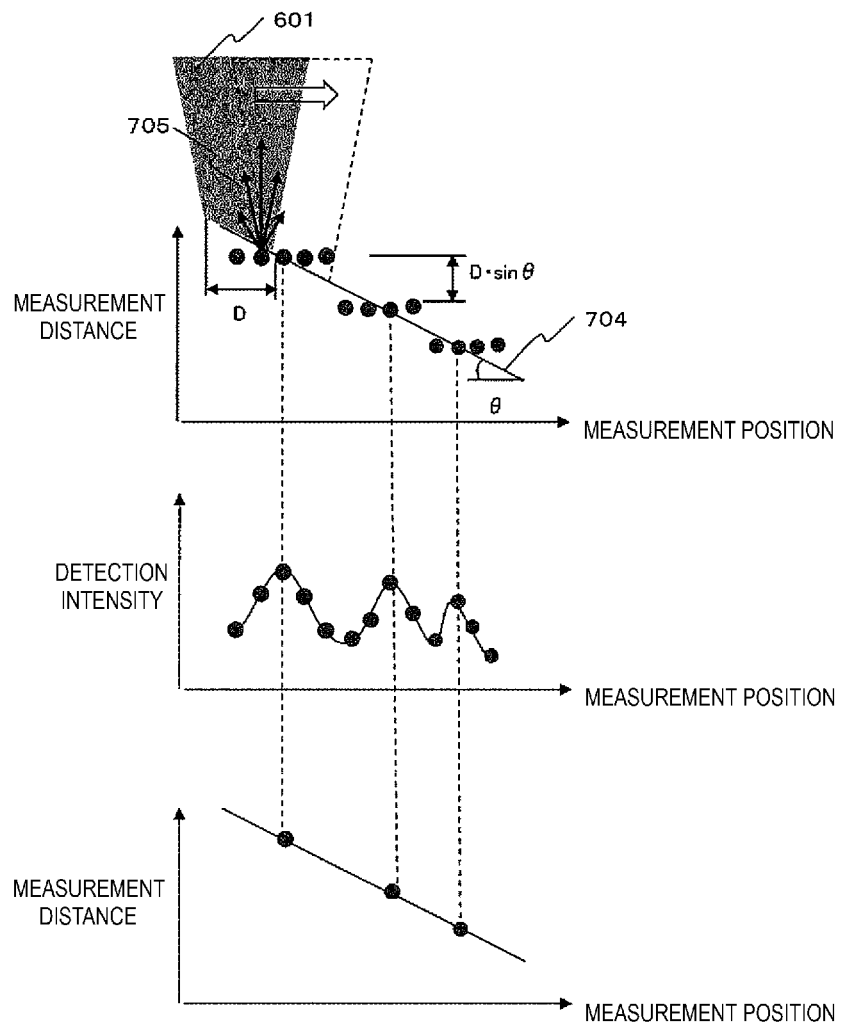
[FIG. 28]
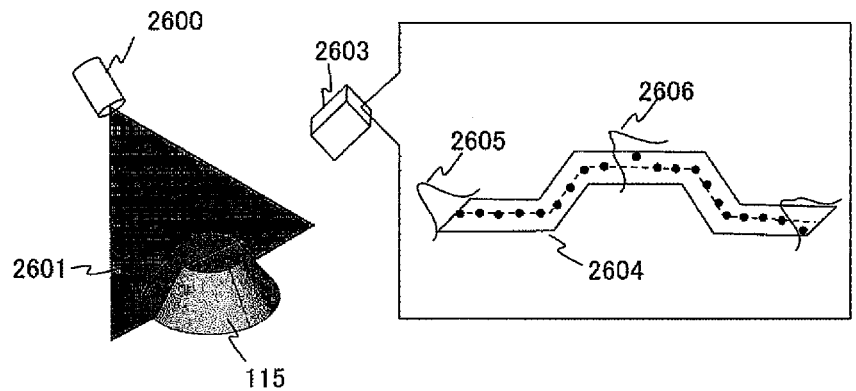

SHAPE MEASURING SYSTEM AND SHAPE MEASURING METHOD

TECHNICAL FIELD

The present invention relates to a shape measuring system and a shape measuring method. The invention claims priority of Japanese Patent Application number 2019-026172, filed on Feb. 18, 2019, the entire subject content of which is incorporated herein by reference in countries where incorporation by reference to related arts is permitted.

BACKGROUND ART

In a method for measuring a shape of a target object in a non-contact manner using light in the related art, measurement accuracy may deteriorate due to noise caused by a positional relationship between a measurement device and the target object or a measurement environment.

As a countermeasure against the deterioration, for example, PTL 1 discloses a technique of measuring the same location a plurality of times, weighting a location with high measurement reproducibility as high reliability, weighting a location with low measurement reproducibility as low reliability, and correcting measurement data based on reliability weighting, thereby improving accuracy of the measurement data.

CITATION LIST

Patent Literature

PTL 1: JP-A-2018-31604

SUMMARY OF INVENTION

Technical Problem

When a rough surface is irradiated with laser light, speckles are generated. A speckle is an interference phenomenon of light generated when coherent light such as laser light is radiated, and has a feature of being generated at random timing in a statistically obtainable location. As described above, although generation of the speckles is random, a reflection intensity thereof is often strong and repetitive reproducibility is often high. When the rough surface is inclined, a measurement error depending on a beam diameter of the laser light and an inclination angle occurs. Since the measurement error often has high repetitive reproducibility, it is difficult to improve the accuracy of the measurement data even when weighting is performed based on the measurement reproducibility as in the technique described in PTL 1.

The invention has been made in view of such circumstances, and an object of the invention is to measure a shape of a target object with high accuracy.

The present application includes a plurality of methods for solving at least a part of the above problems, and examples thereof are as follows.

Solution to Problem

In order to solve the above problems, a shape measuring system according to an aspect of the invention includes: a distance measuring head configured to irradiate a target object with light and receive reflected light from the target object; a distance measuring device configured to generate a distance detection waveform based on the reflected light; and a control device configured to calculate a measurement distance value to the target object by analyzing the distance detection waveform. The control device calculates a feature amount of the distance detection waveform and performs at least one of processing of inputting the feature amount to a correction equation and correcting an error of the measurement distance value, and processing of inputting the feature amount to a reliability weighting equation and performing reliability weighting of the error of the measurement distance value.

Advantageous Effect

According to an aspect of the invention, a shape of a target object can be measured with high accuracy.

Problems, configurations, and effects other than those described above will be apparent from the following description of embodiments.

BRIEF DESCRIPTION OF DRAWINGS

FIG. 1 is a diagram showing a configuration example of a shape measuring system according to an embodiment of the invention.

FIG. 2 is a diagram showing a principle of a frequency modulated continuous wave (FMCW) method.

FIG. 3 is a diagram showing an example of a distance detection waveform according to the FMCW method.

FIG. 4 is a diagram showing a configuration example of a distance measuring head.

FIG. 5 is a diagram showing a configuration example of a scanning mechanism.

FIG. 6 is a diagram showing an example of a distance measurement result relating to a smooth inclined surface.

FIG. 7 is a diagram showing an example of a distance measurement result relating to a rough inclined surface.

FIG. 8 is a diagram showing an example of a distance measurement result obtained when a beam is scanned and measured on the rough inclined surface.

FIG. 9 is a diagram showing a coping method for an error of a measurement distance value caused by speckles.

FIG. 10 is a diagram showing an example of a method for calculating a feature amount based on statistics from a distance detection waveform.

FIG. 11 is a diagram showing an example of a method for calculating the feature amount by waveform fitting.

FIG. 12 is a diagram showing an example of a distance measurement result relating to a smooth curved surface.

FIG. 13 is a diagram showing an example of a distance measurement result relating to a rough curved surface.

FIG. 14 is a flowchart showing an example of a first processing performed by a control device.

FIG. 15 is a diagram showing a configuration example of hardware of a distance measuring device.

FIG. 16 is a diagram showing a display example of a graphical user interface (GUI) screen corresponding to the first processing.

FIG. 17 is a flowchart showing a modification of the first processing.

FIG. 18 is a diagram showing step S11 in FIG. 17.

FIG. 19 is a diagram showing a display example of a GUI screen corresponding to the modification in FIG. 17.

FIG. 20 is a flowchart showing an example of a second processing performed by the control device.

FIG. 21 is a diagram showing an example of a method for calculating a feature amount from a distance detection waveform when an inclination angle of a target object is known.

FIG. 22 is a diagram showing an example of a method for obtaining an inclination angle, a curvature, and a roughness of a target object based on CAD data.

FIG. 23 is a diagram showing a display example of a GUI screen corresponding to the second processing.

FIG. 24 is a flowchart showing an example of a third processing performed by the control device.

FIG. 25 is a diagram showing an example of a method for calculating a step position.

FIG. 26 is a diagram showing a relationship between a speckle position and a distance detection waveform at the time of rough surface and inclined surface measurement.

FIG. 27 is a diagram showing a concept of extracting highly reliable points using continuity of a detected waveform peak intensity.

FIG. 28 is a diagram showing an optical cutting method that can replace the FMCW method.

DESCRIPTION OF EMBODIMENTS

Hereinafter, an embodiment of the invention will be described with reference to drawings. Note that, throughout all the drawings showing the present embodiment, the same members are assigned with the same reference numerals as a general rule, and redundant descriptions are omitted. In the following embodiment, it is needless to say that elements (including steps and the like) are not always indispensable unless otherwise stated or except a case where the elements are apparently indispensable in principle. It is needless to say that expressions "formed of A", "made of A", "having A", and "including A" do not exclude elements other than A unless otherwise stated that A is the only element thereof. Similarly, in the following embodiment, when shapes or positional relationships of the elements or the like are mentioned, substantially approximate and similar shapes and the like are included therein unless otherwise specified or except a case where it is considered that they are apparently excluded in principle.

<Configuration Example of Shape Measuring System 1 According to Embodiment of Invention>

FIG. 1 shows the configuration example of the shape measuring system 1 according to the embodiment of the invention. The shape measuring system 1 adopts a frequency modulated continuous wave (FMCW) method as a distance measuring method. The shape measuring system 1 includes a distance measuring device 100, a distance measuring head 117, a control device 119, a display device 120, and a scanning mechanism 500 (FIG. 5).

In the distance measuring device 100, a distance measurement control unit 116 transmits a sweep waveform signal to an oscillator 102. The oscillator 102 injects a triangular wave current into a laser light source 101 and modulates a driving current. As a result, the laser light source 101 generates frequency modulated (FM) light whose frequency is swept temporally at a constant modulation speed.

The laser light source 101 may be constituted by a semiconductor laser device with an external resonator, and a resonance wavelength of the laser light source 101 may be changed by a triangular wave control signal from the oscillator 102. In this case, FM light whose frequency is temporally swept is generated from the laser light source 101.

The FM light (hereinafter, simply referred to as light) generated by the laser light source 101 is guided to an optical fiber coupler 103. The optical fiber coupler 103 splits the guided light into two. Optical fiber couplers 103, 104, 106, and 111 may be beam splitters.

One of the light split into two by the optical fiber coupler 103 is guided to the optical fiber coupler 104 of a reference optical system. The optical fiber coupler 104 further splits the light into two. One of the light split into two by the optical fiber coupler 104 is provided with a constant optical path difference at an optical fiber 105, and then is multiplexed, at the optical fiber coupler 106, with the other of the light split into two at the optical fiber coupler 104 and is guided to an optical receiver 107. The optical receiver 107 includes a Mach-Zehnder interferometer. The optical receiver 107 detects a constant reference beat signal proportional to an optical path difference of the multiplexed light, and outputs the reference beat signal to the distance measurement control unit 116.

The other of the light split into two by the optical fiber coupler 103 passes through a circulator 108 and is branched by the optical fiber coupler 111. One of the light split by the optical fiber coupler 111 is reflected by a reference mirror 112 and becomes reference light. The other of the light branched by the optical fiber coupler 111 passes through a connection cable 118 as measurement light, is guided to the distance measuring head 117, is emitted to a space by an optical fiber collimator 113, is subjected to beam scanning by a beam scanning mechanism 114, and is radiated to a target object 115.

Reflected light reflected by the target object 115 passes through the beam scanning mechanism 114 and the optical fiber collimator 113 again, is multiplexed with the reference light reflected by the reference mirror 112 at the optical fiber coupler 111, and is guided to the optical receiver 109 by the circulator 108.

Similar to the optical receiver 107, the optical receiver 109 includes a Mach-Zehnder interferometer. The optical receiver 109 detects a measurement beat signal generated by interference of the reference light and the reflected light, and outputs the measurement beat signal to the distance measurement control unit 116.

The distance measurement control unit 116 A/D converts the measurement beat signal from the optical receiver 109 using the reference beat signal from the optical receiver 107 as a sampling clock.

Alternatively, the distance measurement control unit 116 samples the reference beat signal and the measurement beat signal at a constant sampling clock. That is, the reference beat signal can create a signal whose phase is deviated by 90 degrees by performing a Hilbert transform, and a local phase of the signal can be obtained from the reference signal before and after the Hilbert transform. Therefore, by interpolating the phase, a timing at which the reference signal has a constant phase can be obtained. By performing interpolation sampling of the measurement beat signal in accordance with the timing, the measurement signal can be resampled with reference to the reference signal.

Alternatively, even when the distance measurement control unit 116 samples the measurement signal with the reference beat signal as the sampling clock and performs the A/D conversion by using a built-in AD/DA converter, a similar effect can be obtained.

Further, the distance measurement control unit 116 analyzes the beat signal using the FMCW method as the distance measuring method, and transmits distance measurement data obtained as a result thereof to the control device 119.

In the configuration example shown in FIG. 1, the distance measuring device 100 and the control device 119 may be included inside the distance measuring head 117. The control device 119 may be included inside the distance measuring device 100.

Next, a method for calculating the distance measurement data by analyzing the beat signal using the FMCW method in the distance measurement control unit 116 will be described with reference to FIGS. 2 and 3.

FIG. 2 is a diagram showing a principle of the FMCW method. There is a time difference $\Delta t$ between arrival time of reference light 201 and arrival time of a measurement signal 202 at the optical receiver 109, and a frequency of the FM light from the laser light source 101 changes during the time difference. Therefore, the optical receiver 109 detects the beat signal having a beat frequency fb equal to a consequential frequency difference. Assuming that a frequency sweep width is $\Delta v$ and time required to modulate by $\Delta v$ is T, the following Equation (1) exists.

[Equation 1]
$$\Delta t = \frac{T}{2\Delta v} f_b \quad (1)$$

A distance L to the target object 115 is half of a distance by which light proceeds during the time difference $\Delta t$. Therefore, the distance L can be calculated by the following using a light velocity c in the atmosphere.

[Equation 2]
$$L = \frac{cT}{2\Delta v} f_b \quad (2)$$

The distance L and the beat frequency fb have a linear relationship. Therefore, if first Fourier transform (FFT) is performed on the measurement signal obtained by the optical receiver 109 to obtain a peak position and a size, a reflection position and a reflected light amount of the target object 115 can be obtained.

Next, FIG. 3 is a diagram showing a method for obtaining the reflection position on a surface of the target object 115 from a reflection intensity profile, and shows an example of a distance detection waveform of the FMCW method. In the same figure, a horizontal axis represents a frequency axis of FFT, and a vertical axis represents a reflection intensity.

As shown in the same figure, the vicinity of a peak point of a distance detection waveform 301 is discrete data. Here, a peak width w is calculated by a distance resolution $c/2\Delta v$. Specifically, when a function such as a quadratic function or a Gaussian function is applied using data of three or more points in the vicinity of the peak point and a peak of the applied function is used, a position of a measurement target can be obtained with an accuracy equal to or higher than the distance resolution.

Although the FFT has been described as an example of an analysis of the beat frequency, for example, a maximum entropy method may be used for the analysis of the beat frequency. In this case, the peak position can be detected with a higher resolution than the FFT.

Although the distance measurement control unit 116 uses the FMCW method as the distance measuring method, another measuring method for propagation time of light such as optical coherence tomography (OCT) or time of flight (TOF) may be adopted.

Next, FIG. 4 shows a configuration example of the distance measuring head 117. The distance measuring head 117 causes the optical fiber collimator 113 to emit measurement light supplied from the distance measuring device 100 via the connection cable 118 to a space, deflects the emitted light by an optical path switching element 407 corresponding to the beam scanning mechanism 114, and irradiates the target object 115 with the deflected light.

The optical path switching element 407 is held by a probe tip portion 406. The probe tip probe tip portion 406 is held by a rotation mechanism 405. When the rotation mechanism 405 rotates, the optical path switching element 407 rotates so that a cross-sectional shape of the target object 115 can be measured. In order to measure the cross-sectional shape of the target object 115, information on the distance measurement data and a rotation angle of a rotary motor are used.

The configuration shown in FIG. 4 is an example, and the beam scanning mechanism 114 may scan the beam using a galvanometer mirror. When one galvanometer mirror is used, measurement light can be scanned in a one-dimensional manner, and when two galvanometer mirrors are used, the measurement light can be scanned in a binary manner. As the beam scanning mechanism 114, another mechanism capable of deflecting and scanning light, such as a MEMS mirror or a polygon mirror, may be used to perform scanning.

Information such as a length of the probe tip portion 406, a beam deflection angle, and a beam scanning angle is input from the distance measuring head 117 to the distance measurement control unit 116 of the distance measuring device 100. The information is used when the distance measurement control unit 116 generates a three-dimensional shape point group of the target object 115.

Next, FIG. 5 shows a configuration example of the scanning mechanism 500 for three-dimensionally scanning the distance measuring head 117. The scanning mechanism 500 measures a shape of the target object 115 by moving the distance measuring head 117 on a gantry stage.

In the gate-shaped scanning mechanism 500, an X-axis moving mechanism 502 that moves in an X-axis direction is mounted on a Y-axis moving mechanism 501 that moves in a Y-axis direction, and a Z-axis moving mechanism 503 that moves in a Z-axis direction is mounted on the X-axis moving mechanism 502. As a result, the scanning mechanism 500 can three-dimensionally move the distance measuring head 117 around the target object 115.

The Y-axis moving mechanism 501, the X-axis moving mechanism 502, and the Z-axis moving mechanism 503 are driven under the control of the control device 119 to three-dimensionally scan the distance measuring head 117.

As shown in the same figure, by scanning the distance measuring head 117 by the scanning mechanism 500, highly functional non-contact shape measurement can be achieved. When the target object 115 is small and the shape can be measured only by the movement in the Z-axis direction, a position of the target object 115 may be positioned by a jig to be uniquely determined, and the measurement may be performed by moving only the Z-axis moving mechanism 503.

The distance measuring head 117 may be scanned using a general three-axis processing machine without using the scanning mechanism 500. In this case, in the three-axis processing machine, the Z-axis is often provided on a tool side and the X-axis and the Y-axis are provided on a target object side, and thus on-machine measurement by the three-axis processing machine can be achieved by gripping the distance measuring head 117 instead of a tool. A multi-degree-of-freedom robot may grip and move the distance measuring head 117.

<Distance Measurement Result when Surface of Target Object 115 is Inclined Surface>

Next, a distance measurement result when the surface of the target object 115 is an inclined surface will be described with reference to FIGS. 6 to 8.

FIG. 6 shows an example of the distance measurement result when the surface of the target object 115 is a smooth inclined surface. As shown in the figure, the intensity distribution of laser 601 with which the object 115 is irradiated is a Gaussian distribution, and the beam diameter on the target object 115 is set to D. Here, when an inclined surface 604 (inclination angle θ) of the target object 115 is irradiated with the laser 601, a distance difference of D·sin θ occurs in abeam irradiation region. When a reflected light intensity from the inclined surface 604 is uniform, a detected distance detection waveform 602 has a shape having a Gaussian distribution in which a base width is D·sin θ. When the distance measurement is based on the FMCW method, the distance detection waveform 602 in which the distance resolution and the Gaussian distribution are convoluted as shown in FIG. 3 is obtained. A peak point 603 of the distance detection waveform 602 is a center of the Gaussian distribution, and a value of the distance axis of the detected peak point 603 is the distance measurement value.

FIG. 7 shows an example of the distance measurement result when the surface of the target object 115 is a rough inclined surface. When a rough inclined surface 704 is irradiated with the laser 601, speckles are generated. A speckle is an interference phenomenon of light generated when coherent light such as laser light is radiated. A generation location of the speckle is statistically obtained, and has a feature that the speckle is generated at random timing and the reflection intensity is partially increased.

For example, as shown in the same figure, it is assumed that a speckle intensity 705 of the laser 601 is largely detected at a left end of the rough inclined surface 704 of the target object 115. In this case, a distance detection waveform 702 is detected and has a shape different from that of the distance detection waveform 602 of the Gaussian distribution shown in FIG. 6. In this case, since a peak point 703 is an end of abase width of the distance detection waveform 702 and is deviated from the peak point 603 shown in FIG. 6, an error occurs in the distance measurement value.

FIG. 8 shows an example of the distance measurement result when the laser 601 is scanned on the rough inclined surface 704 of the target object 115. When the inclined surface 704 is irradiated with the laser 601 and when the reflected light intensity caused by speckles at a certain position is high, the position is detected as the peak point, and thus the peak point is the distance measurement value. Next, although the laser 601 is scanned to measure a distance of the next position of the inclined surface 704, the previously detected speckle may be irradiated with the laser 601 since the laser 601 has a beam diameter D. In this case, the reflected light intensity caused by the speckle increases again, the point is detected again as the peak point, and the position at the peak point becomes a distance measurement value corresponding to the beam position after scanning.

In this case, since the distance is measured by scanning the inclined surface, although the previous distance measurement value and the current distance measurement value should originally be different values, a phenomenon occurs in which the distance measurement value does not change while a certain speckle is irradiated with the laser 601. Then, when the laser 601 deviates from the speckle, a peak point is detected with respect to the next dominant speckle. As a result, as shown in FIG. 8, a stepwise distance measurement value having a step width D·sin θ is obtained. However, since the speckles are statistically generated, the distance measurement value is not necessarily stepwise.

<Coping Method for Error in Measurement Distance Value Caused by Speckle>

Next, a coping method for an error in the measurement distance value caused by speckles that may be generated on the rough inclined surface of the target object 115 will be described. In the present embodiment, as the coping method, at least one of a measurement distance value correcting processing and a reliability weighting processing is performed.

FIG. 9 shows a concept of the coping method for the error of the measurement distance value caused by the speckles. As described above with reference to FIG. 7, the error of the measurement distance value caused by the speckle is generated due to distortion of the distance detection waveform according to a generation position of the speckle. The error of the measurement distance value increases as the distortion of the distance detection waveform increases. Therefore, the feature amount of the shape of the distance detection waveform is calculated, and at least one of the measurement distance value correcting processing and the reliability weighting processing is performed based on the calculated feature amount.

FIG. 10 is a diagram showing processing of calculating the feature amount from the distance detection waveform. Hereinafter, a method for using, for example, skewness as the feature amount of the distance detection waveform will be described. As shown in the same figure, when the number of points constituting the distance detection waveform is n, the distance between the points is $x_i$, the detection intensity is $p_i$, the average distance is $x_a$, and the standard deviation is σ, the skewness S can be obtained by the following Equation (3) (feature amount calculation equation).

[Equation 3]

$$s = \frac{1}{n}\sum_{i=1}^{n}\left(\frac{(x_i - x_a)p_i}{\sigma}\right)^3 \quad (3)$$

Further, as shown in the following Equation (4) (correction equation), a correction amount C can be obtained by multiplying a cube root of the obtained skewness S by a coefficient α.

[Equation 4]

$$c = \alpha \cdot S^{\frac{1}{3}} \quad (4)$$

The coefficient α may be determined based on an experiment, or may be determined based on an optical simulation in which speckle generation is modeled. Equation (4) is an example of a correction equation for obtaining the correction amount C, and an expression other than Equation (4) may be used as the correction equation.

As shown in the following equation (5) (reliability weighting equation), a reliability weighting amount w can be obtained by multiplying the obtained skewness S by a coefficient β.

[Equation 5]

$$w = \beta \cdot S^{\frac{1}{3}} \quad (5)$$

The coefficient β may be determined based on an experiment, or may be determined based on an optical simulation in which the speckle generation is modeled. Equation (5) is an example of a reliability weighting equation, and an expression other than Equation (5) may be used as the reliability weighting equation.

In Equation (3), although the skewness S is calculated as the feature amount of the distance detection waveform, the feature amount is not limited to the skewness S. For example, statistics such as variance and kurtosis may be calculated as the feature amount.

As another feature amount calculation method, waveform fitting may be used. As described with reference to FIG. 7, the reflection intensity at a certain position is increased depending on speckles, and thus the distortion occurs in the distance detection waveform. The shape of the detection waveform is a distribution in which reflected light from a plurality of positions is superimposed. Therefore, by performing fitting using a plurality of waveforms, a waveform most similar to the distance detection waveform can be calculated.

Next, FIG. 11 is a diagram showing the feature amount calculation method by using the waveform fitting. In a case of the same figure, although two waveforms 1101 and 1102 indicated by broken lines are fitted to the distance detection waveform 702 indicated by a solid line, the number of waveforms used for the fitting is not limited to two, and may be two or more.

Fitting parameters are center coordinates, peak values, variances, and phases of the waveforms 1101 and 1102. In the fitting, values of the parameters of the waveforms 1101 and 1102 are determined to be most applicable to the distance detection waveform 702. The determined parameters are set as feature amounts, and a correction amount or a reliability weighting amount is determined using the feature amounts.

For example, when x1 is determined as the center coordinate of the waveform 1101 and x2 is determined as the center coordinate of the waveform 1102, a coordinate x3 which is an intermediate value thereof may be used as a correction value. Alternatively, a difference x3-x between the coordinate x3 and the coordinate x of the peak point 1103 of the distance detection waveform 702 may be used as the reliability weighting amount.

The waveform fitting method described with reference to FIG. 11, and a correction method and a reliability weighting method using the waveform fitting method are merely examples, and other methods may be used.

<Distance Measurement Result when Surface of Target Object 115 is Curved Surface>

Next, a distance measurement result when the surface of the target object 115 is the curved surface will be described with reference to FIGS. 12 to 13.

FIG. 12 shows an example of the distance measurement result when the surface of the target object 115 is a smooth curved surface. In the same figure, it is assumed that the reflected light intensity from a curved surface 1203 of the target object 115 is uniform, and the curved surface 1203 is irradiated with the laser 601 having a predetermined beam diameter. In this case, since a normal direction vector of the curved surface 1203 is different depending on an irradiation position of the laser 601, a normal vector 1201 of the curved surface on a left side of the laser 601 is oriented in a beam irradiation direction, and a normal vector 1202 of the curved surface on a right side of the laser 601 is inclined rightward relative to the beam irradiation direction.

In this case, an intensity of the reflected light reflected in the direction of the normal vector 1201 toward abeam irradiation direction is higher than an intensity of the reflected light reflected in the direction of the normal vector 1202. Therefore, a distance detection waveform 1205 has a shape in which distortion occurs in the Gaussian distribution, and a peak point 1206 is detected near a beam center position. Further, when distance measurement is performed by scanning the curved surface 1203 with the laser 601, a peak point is detected near the beam center position at each measurement position. As a result, a curve (distance measurement value) 1204 having a curvature radius larger than that of the actual curved surface 1203 is measured.

FIG. 13 shows an example of the distance measurement result when the surface of the target object 115 is a rough curved surface. As shown in the same figure, when a rough curved surface 1301 is irradiated with the laser 601, a stepwise error due to the speckles occurs similar to the case shown in FIG. 7. As a result, a curve (distance measurement value) 1302 having a curvature radius larger than that of the actual curved surface 1301 and in which a step-like error is generated is measured.

A distance error generated when the curved surface of the target object 115 is measured is also caused by the distortion of the shape of the distance detection waveform, similar to the distance error that occurs when the inclined surface is measured. Therefore, for correction or reliability weighting for the curved surface, the correction or the reliability weighting using the skewness described with reference to FIG. 10 as the feature amount, or the correction or the reliability weighting using a parameter obtained by the waveform fitting described with reference to FIG. 11 as the feature amount can be applied.

<First Processing by Control Device 119>

Next, FIG. 14 shows an example of the first processing performed by the control device 119 for coping with a distance measurement error caused by speckles. The first processing performs at least one of a correcting processing and a reliability weighting processing on a measurement point group as a coping method against a distance measurement error caused by the speckles.

First, input information 1400 for the first processing will be described. The input information 1400 includes distance measurement information 1403, distance measuring head scanning mechanism information 1404, a correction parameter 1405, and a reliability weighting parameter 1406.

The distance measurement information 1403 includes the distance measurement data (distance detection waveform) measured by the distance measuring device 100 described with reference to FIG. 1, rotation angle data of the rotation mechanism 405 (FIG. 4), and the like.

The distance measurement data may be all data of an FFT result with respect to the beat frequency, or may be data of a point at which a peak is detected and n points before and after the point when a data amount is large. Here, n is a score required for characterizing the distance detection waveform, and is determined in advance by an experiment or by optical simulation. Further, n may be a fixed value or may be changed as a parameter.

The distance measuring head scanning mechanism information 1404 includes scanning coordinates of three axes of the scanning mechanism 500 (FIG. 5) of the distance measuring head 117.

The correction parameter 1405 and the reliability weighting parameter 1406 are parameters necessary for performing correction or reliability weighting described later.

In the first processing, first, the control device 119 acquires a distance detection waveform from the distance measuring device 100 (step S1), and then calculates the feature amount from the distance detection waveform (step S2). Next, the control device 119 performs at least one of a processing of inputting the feature amount to the correction equation and correcting the feature amount and a processing of inputting the feature amount to the reliability weighting equation and performing reliability weighting (step S3). At this time, the correction amount and the reliability weighting amount can be adjusted by using the correction parameter 1405 or the reliability weighting parameter 1406. Next, the control device 119 calculates reliability-weighted three-dimensional point group coordinates based on the reliability-weighted distance obtained in step S3, the scanning coordinates of the distance measuring head 117 as the distance measuring head scanning mechanism information 1404, the rotation angle data of the rotation mechanism 405 as the distance measurement information 1403, and the like (step S4). Then, the control device 119 outputs a reliability weighted point group 1411 as output information 1402.

Next, FIG. 15 shows a configuration example of hardware of the control device 119. The control device 119 includes, for example, a general computer, and includes a central processing unit (CPU) 1501, a memory 1502, and a storage device 1503. The CPU 1501 executes the first processing and the like shown in FIG. 14 by executing a predetermined program loaded in the memory 1502. The memory 1502 holds the above-described program and data during processing. The storage device 1503 stores a feature amount calculation equation, a correction equation, a reliability weighting equation, and the like.

Next, FIG. 16 shows a display example of a GUI screen 1600 displayed on the display device 120 according to the first processing.

The GUI screen 1600 includes a distance measurement information display field 1601, a distance measuring head scanning mechanism information display field 1602, a correction parameter display field 1603, a reliability weighting parameter display field 1604, and a reliability weighted point group display field 1605.

In the distance measurement information display field 1601, identification information on the distance measuring head 117 is displayed. In the distance measuring head scanning mechanism information display field 1602, the identification information on the scanning mechanism 500 is displayed. A user can input and set a correction parameter in the correction parameter display field 1603. The user can input and set a reliability weighting parameter in the reliability weighting parameter display field 1604. A reliability weighted point group is displayed in the reliability weighted point group display field 1605.

For example, the user can change the correction parameter and the reliability weighting parameter by viewing the reliability weighted point group displayed in the reliability weighted point group display field 1605.

<Modification of First Processing>

Next, FIG. 17 is a flowchart showing a modification of the first processing. In the modification, point group processing (steps S11 and S12) is added to the first processing (FIG. 14).

In the point group processing, a noise removal parameter 1703 and a fitting parameter 1704 are input as input information 1700 in addition to the reliability weighted point group 1411 as the result of the first processing, and the control device 119 performs noise removal and fitting on the reliability weighted point group 1411 (step S11). Next, the control device 119 outputs three-dimensional shape data 1707 obtained as a result of step S11 as output information 1702 (step S12).

FIG. 18 shows a processing of calculating a shape by noise removal and fitting with respect to the reliability weighted point group 1411 in step S11.

In step S11, a point having low reliability in the reliability weighted point group 1411 measured by the distance measuring head 117 is highly likely to deviate from a true shape, and the point is determined to be noise and removed. Then, fitting is performed on the remaining point group without being removed based on the reliability weighting amount. As an example of the fitting, a case where a surface is formed using a polygon is considered. By forming the polygon in accordance with a weight of the reliability, it is possible to calculate a three-dimensional shape 1800 with high accuracy. Although the polygon may be a triangle or a quadrangle, the polygon may be a polygon having angles of more than two.

Next, FIG. 19 shows a display example of a GUI screen 1900 displayed on the display device 120 according to the modification of the first processing. The GUI screen 1900 is obtained by adding a noise removal parameter setting field 1901, a fitting parameter setting field 1902, and a three-dimensional shape data display field 1903 to the GUI screen 1600 (FIG. 16).

The user can input and set a noise removal parameter in the noise removal parameter setting field 1901. The user can input and set a fitting parameter in the fitting parameter setting field 1902.

For example, the user can change the noise removal parameter and the fitting parameter by viewing the three-dimensional shape data displayed in the three-dimensional shape data display field 1903.

In the above description, an error of a measurement distance that may occur when the inclined surface or the curved surface of the target object 115 is rough has been described. However, in the FMCW method, if the surface of the target object 115 is not an inclined surface or a curved surface and is rough, the error in the measurement distance may be generated.

In the FMCW method, the distance is calculated from the interference beat frequency between the reference light and the measurement light. When the phase is deviated in a wavelength order of the reference light and the measurement light due to an influence of a surface roughness, the beat frequency may be deviated and the error may be generated in the measurement distance since interference of light is used. However, even when the error is generated, the error due to the roughness due to continuity of measurement points can be reduced.

<Second Processing by Control Device 119>

Next, a second processing that can be executed when computer aided design (CAD) data of the target object 115 can be acquired by the control device 119 will be described.

When the CAD data of the target object 115 can be acquired, an irradiation angle and the curvature radius of the target object 115 are obtained from a position and a posture of the distance measuring head 117 relative to the target object 115. Accordingly, at least one of the correction and the reliability weighting is performed by using the obtained irradiation angle and the curvature radius as the feature amount.

If the irradiation angle and the curvature radius of the target object 115 are known, the correction or the reliability weighting can be performed with further increased accuracy. By adding surface roughness information on the target object 115, the correction or the reliability weighting can be performed more accurately. When the roughness information is attached to the CAD data, the information is used, and when the roughness information is not attached to the CAD data, the user may input the roughness information on the GUI screen.

FIG. 20 is a flowchart showing an example of the second processing performed by the control device 119. Input information 2000 for the second processing is obtained by adding target object CAD information 2001, target object roughness information 2002, and distance measuring head position and posture information 2003 to the input information 1400 (FIG. 14).

In the second processing, first, the control device 119 determines a relative position of the target object 115 and the distance measuring head 117 (step S21). Next, the control device 119 obtains the inclination angle with respect to irradiation light, the curvature radius, and a roughness of the target object 115 from the target object CAD information 2001 and the distance measuring head position and posture information 2003 (step S22). Next, the control device 119 acquires the distance detection waveform from the distance measuring device 100 (step S23). Next, the control device 119 calculates a feature amount from the distance measurement waveform based on the inclination angle, the curvature radius, and the roughness of the target object 115 obtained in step S22 (step S24).

Next, the control device 119 executes at least one of the processing of inputting the feature amount to the correction equation and correcting the feature amount and the processing of inputting the feature amount to the reliability weighting equation and performing reliability weighting (step S25). Next, the control device 119 calculates a reliability-weighted three-dimensional point group based on the distance measuring head scanning mechanism information 1404, a rotation angle of the rotation mechanism 405 as the distance measurement information 1403, and the reliability-weighted distance obtained in step S25 (step S26). Then, the control device 119 outputs, as output information 2004, CAD information 2010 to which information on the inclination angle with respect to the irradiation light, the curvature radius, and the roughness of the target object 115 is added, and a reliability weighted point group 2011.

In the second processing, similar to in the modification of the first processing (FIG. 17), noise removal or fitting is performed by using the output reliability weighted point group 2011, and the processing can be modified such that a shape is able to be calculated with high accuracy.

Next, FIG. 21 is a diagram showing an example of a correction or reliability weighting method when the inclination angle of an inclined surface of the target object 115 is known in advance based on the CAD data.

When the inclination angle θ is known in advance, the distance difference D·sin θ can be calculated from the beam diameter D. In this case, a base width 2101 of the peak of the distance detection waveform 702 can be known and used as the feature amount, and for example, a center position 2100 thereof can be corrected as the peak point. Alternatively, a difference xc-x between a coordinate xc of the peak point and a peak coordinate x of the distance detection waveform 702 may be used as the reliability weighting amount. However, the correction method or the reliability weighting method shown in FIG. 21 is an example, and other methods may be used.

Next, FIG. 22 is a diagram showing a method for obtaining the inclination angle, the curvature radius, and the roughness of the target object 115 based on the CAD data and the relative position of the target object 115 and the distance measuring head 117.

An incident angle of the beam emitted from the distance measuring head 117 to the target object 115 can be geometrically calculated by the control device 119 based on the CAD data of the target object 115 and the position and posture of the distance measuring head 117, the inclination angle and the curvature radius of the measurement target with respect to the irradiation light can be obtained. When the roughness information is added to the CAD data, roughness information on a location irradiated with the laser is used. When the roughness information is not added to the CAD data, the value input and set by the user using the GUI screen is used. Then, the control device 119 adds calculation results of the inclination angle, the curvature radius, and the roughness to the target object CAD information 2001.

Next, FIG. 23 shows a display example of a GUI screen 2300 displayed on the display device 120 according to the second processing. The GUI screen 2300 is obtained by adding a target object CAD information display field 2301, a target object roughness information display field 2302, a distance measuring head position and posture display field 2303, and a target object inclination angle, a curvature radius, and a roughness display field 2304 to the GUI screen 1600 (FIG. 16).

In the target object CAD information display field 2301, an acquisition destination (file path) of the target object CAD information is displayed. In the target object roughness information display field 2302, an acquisition destination (file path) of the target object roughness information is displayed. In the distance measuring head position and posture display field 2303, an acquisition destination (file path) of the position and posture information of the distance measuring head is displayed. In the target object inclination angle, the curvature radius, and the roughness display field 2304, CAD data to which the inclination angle, the curvature radius, and the roughness of the target object 115 are added is displayed.

<Third Processing by Control Device 119>

Next, the third processing performed by the control device 119 will be described.

In the third processing, instead of the CAD data of the target object 115, the inclination angle, the curvature radius, and the roughness of a measurement region of the target object 115 are obtained based on the continuity of the distance measurement data. Based on these, at least one of the correction and the reliability weighting is performed with increased accuracy.

FIG. 24 is a flowchart showing an example of the third processing performed by the control device 119. The input information 1400 for the third processing is similar to the input information 1400 for the first processing (FIG. 14).

In the third processing, first, the control device 119 acquires a distance detection waveform from the distance measurement information 1403 (step S31), and then calculates the feature amount from the distance detection waveform (step S32). Next, the control device 119 performs at least one of the processing of inputting the feature amount to the correction equation and correcting the feature amount and the processing of inputting the feature amount to the reliability weighting equation and performing reliability weighting (step S33). At the time, the correction amount and the reliability weighting amount can be adjusted by using the correction parameter 1405 or the reliability weighting parameter 1406. Next, the control device 119 calculates the reliability-weighted three-dimensional point group coordinates based on the reliability-weighted distance obtained in step S33, the scanning coordinates of the distance measuring head 117 as the distance measuring head scanning mechanism information 1404, the rotation angle data of the rotation mechanism 405 as the distance measurement information 1403, and the like (step S34).

Next, the control device 119 calculates the inclination angle, the curvature radius, and the roughness of the measurement target region from the continuity of the measurement point group (step S35). Next, the control device 119 calculates a feature amount from the distance detection waveform again based on the information on the inclination angle, the curvature radius, and the roughness calculated in step S35 (step S36). Next, the control device 119 performs at least one of the processing of inputting the feature amount to the correction equation and correcting the feature amount and the processing of inputting the feature amount to the reliability weighting equation and performing reliability weighting (step S37). At this time, the correction amount and the reliability weighting amount can be adjusted by using the correction parameter 1405 or the reliability weighting parameter 1406. Next, the control device 119 calculates the reliability-weighted three-dimensional point group coordinates based on the reliability-weighted distance obtained in step S37, the scanning coordinates of the distance measuring head 117, the rotation angle data of the rotation mechanism 405 as the distance measurement information 1403, and the like (step S38). Then, the control device 119 outputs the reliability weighted point group 1411 as the output information 1402.

In the third processing, similar to the modification of the first processing (FIG. 17), noise removal or fitting is performed by using the output reliability weighted point group 2011, and the processing can be modified such that the shape is able to be calculated with high accuracy.

<Measurement of Target Object 115 Having Step>

Next, FIG. 25 is a diagram showing a method for accurately obtaining a step 2501 of the target object 115. When measuring the step 2501 of the target object 115, since reflected light from an upper surface and reflected light from a lower surface of the step 2501 are simultaneously detected, detection peaks are detected at two locations.

Therefore, an edge of the step is obtained from the distance detection waveform obtained when the laser 601 is scanned. As shown in an upper part of the figure, when a center of the laser 601 is in front of the step 2501, since an irradiation area on the upper surface is large, a reflected light intensity 2502 from the upper surface is strong, and a reflected light intensity 2503 from the lower surface is weak. Next, when the laser 601 is scanned in a rightward direction and the center of the laser 601 is at the step, the reflected light intensities 2502 and 2503 from the upper surface and the lower surface are equal to each other. Further, when the laser 601 is scanned in the rightward direction and the center of the laser 601 exceeds the step 2501, the reflected light intensity 2502 from the upper surface is weak and the reflected light intensity 2503 from the lower surface is strong.

Therefore, if a position of the distance measuring head 117 when the reflected light intensities 2502 and 2503 of the upper surface and the lower surface are equal is regarded as a position of the step 2501, the position of the step 2501 can be obtained with high accuracy. When the scanning of the laser 601 is discrete and the intensities of the upper surface and the lower surface are not equal to each other, a position at which the intensity ratios are equal to each other may be obtained from the previous and subsequent scanning results by interpolation.

However, when the upper surface and the lower surface have different light reflectances, a point where the reflected light intensities from the upper surface and the lower surface are equal to each other is not the position of the step. In this case, an intensity of the reflected light intensity of the upper surface is obtained from the reflected light intensity 2502 from the upper surface obtained when the entire laser 601 is in front of the step 2501, an intensity of the reflected light intensity of the lower surface is obtained from the reflected light intensity 2503 from the lower surface obtained when the entire laser 601 exceeds the step 2501, a difference in reflectance is obtained from the ratio, and then the position of the step 2501 may be obtained.

When a height of the step 2501 increases, a part of the reflected light from the lower surface is blocked by the step 2501, and thus the reflected light amount may decrease. An attenuation amount is geometrically determined by the incident angle of the laser 601 and a step distance. Therefore, the height of the step is obtained from the measurement distance difference between the upper surface and the lower surface, the attenuation amount is further calculated, and the position of the step 2501 may be obtained from a reflected light amount ratio between the upper surface and the lower surface in consideration of the obtained attenuation amount.

Modification

As the feature amount of the distance detection waveform, peak intensity information on the distance detection waveform may be used.

FIG. 26 is a diagram showing a relationship between a speckle position and the distance detection waveform at the time of rough surface and inclined surface measurement.

An irradiation beam 601 has a Gaussian distribution. When speckles are generated at an end of the beam, a detection waveform is distorted as indicated by 2701 and a detection intensity is decreased. Next, when the beam scanning is performed and the speckles are generated at a center of the beam, as shown in a detection waveform 2702, the distortion is reduced and the detection intensity is increased. Further, when the beam scanning is performed and the speckles are generated at the end of the beam, the detection waveform is distorted again as indicated by 2703 and the detection intensity is decreased. Therefore, highly reliable points are extracted by using the continuity of the detected waveform peak intensity.

FIG. 27 shows a concept of extracting the highly reliable points using the continuity of the detected waveform peak intensity.

The distance measurement result obtained by performing beam scanning on the rough surface and inclined surface is stepwise. A cycle of the step depends on a beam spot size. When the detected waveform peak intensity obtained at this time is plotted, the peak intensity has a distribution corresponding to the cycle of the step. The intensity is weak when the speckles are located at the end of the beam, the intensity has a maximum value when the speckles are located at the center of the beam, and the intensity is weak when the speckles deviates from the center of the beam. Therefore, by extracting a point at which the intensity has the maximum value, the measurement error can be reduced and an actual shape can be obtained with high accuracy.

As a calculation method for the maximum value, after the peak point extraction, the accuracy can be improved by peak interpolation using three points before and after the peak point extraction. Alternatively, since the beam has a Gaussian distribution, the peak may be accurately obtained by Gaussian fitting.

Although it has been described that only an intensity maximum value is extracted, the reliability weighting may be performed using intensity information. Specifically, the intensity maximum value and an intensity minimum value are obtained from the continuity of a peak intensity by the method described above, a weight of a point corresponding to the maximum value is set to be the largest and a weight of a point corresponding to the minimum value is set to be the smallest, and a point between the maximum value and the minimum value is weighted by the interpolation based on the peak intensity. As the interpolation, for example, linear interpolation is used. For the weighted point group, similar to the modification of the first processing (FIG. 17), the noise removal or the fitting is performed by using the output reliability weighted point group, and the shape can be calculated with high accuracy.

The error is corrected and reduced by using the feature amounts such as the skewness and the kurtosis described in the first processing. Further, the error can be further reduced by weighting based on the peak intensity.

Although in the above-described embodiment, the feature amounts of the distance detection waveform are detected using the skewness, the kurtosis, and the fitting, the feature amounts may be detected using a center of gravity.

<Optical Cutting Method that can Replace FMCW Method>

FIG. 28 is a diagram showing an optical cutting method that can replace the FMCW method.

In the optical cutting method, the target object 115 is irradiated with a line-shaped beam 2601 from a light source 2600. When a camera 2603 captures an image of the line-shaped beam 2601 with which the target object 115 is irradiated, an optical cutting line 2604 along the shape of the target object 115 is formed in the obtained image. The shape of the target object 115 can be calculated from the optical cutting line 2604. An intensity profile of the line-shaped beam 2601 has a Gaussian distribution 2605, and usually, an intensity of the optical cutting line 2604 also has a Gaussian distribution. However, when the surface of the target object 115 is rough, speckles are generated, distortion is generated in a distance detection waveform 2606, the peak point is erroneously detected, and an error may occur in the measurement distance. Therefore, similar to the method described with reference to FIGS. 10 and 11, if at least one of the correction of the measurement distance and the reliability weighting is performed based on the feature amount of the shape of the target object 115, the shape of the target object 115 can be accurately calculated.

Although the embodiments and modifications of the invention have been described above, the invention is not limited to examples of the above embodiments, and includes various modifications. For example, the examples of the above-described embodiments have been described in detail in order to make the invention easy to understand, and the invention is not limited to including all the configurations described herein. A part of a configuration of an example in a certain embodiment can be replaced with a configuration of another example. A configuration of another example can be added to a configuration of an example of a certain embodiment. Another configuration may be added to, deleted from, or replaced with a part of a configuration of an example in each embodiment. Each of the above-described configurations, functions, processing units, processing methods, and the like may be implemented by hardware by designing apart or all of them with, for example, an integrated circuit. Control lines and information lines shown in the figures are considered to be necessary for description, and all the lines are not necessarily shown. It may be considered that almost all configurations are connected to each other.

The configuration of a distance measurement system described above can also be classified into more elements according to the processing contents. One element can also be classified to execute more processing.

REFERENCE SIGN LIST

1 shape measuring system
100 distance measuring device
101 laser light source
102 oscillator
103 optical fiber coupler
104 optical fiber coupler
105 optical fiber
106 optical fiber coupler
107 optical receiver
108 circulator
109 optical receiver
111 optical fiber coupler
112 reference mirror
113 optical fiber collimator
114 beam scanning mechanism
115 target object
116 distance measurement control unit
117 distance measuring head
118 connection cable
119 control device
120 display device
201 reference light
202 measurement signal
301 distance detection waveform
405 rotation mechanism
406 probe tip portion
407 optical path switching element
500 scanning mechanism
501 Y-axis moving mechanism
502 X-axis moving mechanism
503 Z-axis moving mechanism
601 laser
602 distance detection waveform
603 peak point
604 inclined surface
702 distance detection waveform
703 peak point
704 inclined surface
705 speckle intensity
1101, 1102 normal vector
1103 peak point
1201, 1202 normal vector
1203 curved surface
1204 distance measurement value 1205 distance detection waveform
1206 peak point
1301 curved surface
1302 distance measurement value
1400 input information
1402 output information
1403 distance measurement information
1404 distance measuring head scanning mechanism information
1405 correction parameter
1406 reliability weighting parameter
1411 reliability weighted point group
1501 CPU
1502 memory
1503 storage device
1600 GUI screen
1601 distance measurement information display field
1602 distance measuring head scanning mechanism information display field
1603 correction parameter display field
1604 reliability weighting parameter display field
1605 reliability weighted point group display field
1700 input information
1702 output information
1703 noise removal parameter
1704 fitting parameter
1900 GUI screen
1901 noise removal parameter setting field
1902 fitting parameter setting field
2000 input information
2001 target object CAD information
2002 target object roughness information
2003 distance measuring head position and posture information
2004 output information
2010 CAD information
2011 reliability weighted point group
2100 center position
2101 base width
2300 GUI screen
2301 target object CAD information
2302 target object roughness information display field
2303 distance measuring head position and posture display field
2304 roughness display field
2501 step
2502 reflected light intensity
2503 reflected light intensity
2600 light source
2601 line-shaped beam
2603 camera
2604 optical cutting line
2605 Gaussian distribution
2606 distance detection waveform
c distance resolution

The invention claimed is:

1. A shape measuring system comprising:
a distance measuring head configured to irradiate a target object with light and receive reflected light from the target object;
a distance measuring device configured to generate a distance detection waveform based on the reflected light; and
a control device configured to calculate a measurement distance value to the target object by analyzing the distance detection waveform, wherein
the control device calculates a feature amount of the distance detection waveform and performs at least one of processing of inputting the feature amount to a correction equation and correcting an error of the measurement distance value, and processing of inputting the feature amount to a reliability weighting equation and performing reliability weighting of the error of the measurement distance value; wherein
the control device acquires an inclination angle, a curvature radius, and roughness of the target object based on CAD data of the target object and an irradiation direction of the light, and calculates the feature amount of the distance detection waveform based on the inclination angle, the curvature radius, and the roughness.

2. The shape measuring system according to claim 1, wherein
the distance measuring device generates the distance detection waveform based on the reflected light using an FMCW method, an OCT method, a TOF method, or an optical cutting method.

3. The shape measuring system according to claim 1, wherein
the control device calculates a variance, a skewness, a kurtosis, or a center of gravity as the feature amount of the distance detection waveform.

4. The shape measuring system according to claim 1, wherein
the control device calculates the feature amount of the distance detection waveform based on waveform fitting.

5. The shape measuring system according to claim 1, wherein
the control device calculates the feature amount of the distance detection waveform based on a relative value of a peak intensity of the distance detection waveform and a peak intensity of a surrounding detection waveform.

6. The shape measuring system according to claim 1, wherein
an adjustable parameter of at least one of the correction equation and the reliability weighting equation, where an adjustment of the adjustable paramater is made by a user.

7. The shape measuring system according to claim 1, wherein
the control device outputs a reliability-weighted measurement point group.

8. The shape measuring system according to claim 7, wherein
the control device removes noise from the reliability-weighted point group according to a weighting amount, and calculates a shape by fitting.

9. The shape measuring system according to claim 1, wherein
when measuring the target object having a step, the control device calculates a position of the step based on the feature amount of the distance detection waveform having a plurality of peak points.

10. The shape measuring system according to claim 1, wherein
when information indicating the roughness of the target object is not added to the CAD data, a user can input the information indicating the roughness.

* * * * *